(12) United States Patent
Squires et al.

(10) Patent No.: US 10,843,438 B2
(45) Date of Patent: Nov. 24, 2020

(54) CHEMICAL BARRIER FABRIC

(71) Applicant: ANSELL MICROGARD LIMITED, East Yorkshire (GB)

(72) Inventors: Leslie James Squires, Blairgowrie (GB); Timothy Woodbridge, Hertfordshire (GB)

(73) Assignee: Ansell Microgard Limited, East Yorkshire (GB)

( * ) Notice: Subject to any disclaimer, the term of this patent is extended or adjusted under 35 U.S.C. 154(b) by 963 days.

(21) Appl. No.: 13/865,347

(22) Filed: Apr. 18, 2013

(65) Prior Publication Data

US 2014/0141210 A1    May 22, 2014

Related U.S. Application Data

(63) Continuation of application No. 12/091,361, filed as application No. PCT/GB2006/003906 on Oct. 20, 2006, now abandoned.

(30) Foreign Application Priority Data

Oct. 24, 2005   (GB) .................................. 0521630.4

(51) Int. Cl.
*B32B 7/05* (2019.01)
*B29C 65/02* (2006.01)
(Continued)

(52) U.S. Cl.
CPC ................ *B32B 7/05* (2019.01); *B29C 65/02* (2013.01); *B29C 65/086* (2013.01); *B29C 65/18* (2013.01);
(Continued)

(58) Field of Classification Search
CPC ................................... B32B 7/045; B32B 7/05
(Continued)

(56) References Cited

U.S. PATENT DOCUMENTS 689,990 A    11/1901  Schroeder
3,169,899 A   2/1965  Steuber
(Continued)

FOREIGN PATENT DOCUMENTS

EP    0097206 A1    1/1984
EP    0391661 A2    4/1990
(Continued)

OTHER PUBLICATIONS

Lue, C.T. et al.; "Economical Breathable Films for Medical and Consumer Soft Goods"; Polymers, Laminations & Coatings Conference; 1999; pp. 845-849.
(Continued)

*Primary Examiner* — Peter Y Choi
(74) *Attorney, Agent, or Firm* — Moser Taboada

(57) ABSTRACT

A chemical barrier fabric and a method of manufacturing the fabric is provided. The chemical barrier fabric includes at least first and second chemical barrier layers which have an interfacial region therebetween and which are intermittently point bonded providing a point-bonded area which is in the minority and an un-bonded area which is in the majority in the interfacial region. The chemical barrier layers typically comprise single layer polymer films and/or co-extruded layers. A non-woven layer may also be point-bonded to either the first or the second chemical barrier layer to give support to the fabric.

20 Claims, 13 Drawing Sheets

(51) Int. Cl.

| | | |
|---|---|---|
| B32B 27/08 | (2006.01) | |
| B32B 27/12 | (2006.01) | |
| B29C 65/00 | (2006.01) | |
| D04H 1/555 | (2012.01) | |
| B32B 3/28 | (2006.01) | |
| B32B 33/00 | (2006.01) | |
| D04H 13/00 | (2006.01) | |
| B29C 65/08 | (2006.01) | |
| B29C 65/18 | (2006.01) | |
| B32B 5/02 | (2006.01) | |
| B32B 7/12 | (2006.01) | |
| B32B 27/32 | (2006.01) | |
| B29K 105/08 | (2006.01) | |
| B32B 37/00 | (2006.01) | |
| B29L 9/00 | (2006.01) | |

(52) U.S. Cl.
CPC .... *B29C 66/7234* (2013.01); *B29C 66/73921* (2013.01); *B29C 66/81429* (2013.01); *B29C 66/81433* (2013.01); *B29C 66/83411* (2013.01); *B29C 66/83413* (2013.01); *B29C 66/91421* (2013.01); *B29C 66/91431* (2013.01); *B29C 66/91641* (2013.01); *B29C 66/91931* (2013.01); *B32B 3/28* (2013.01); *B32B 5/022* (2013.01); *B32B 7/12* (2013.01); *B32B 27/08* (2013.01); *B32B 27/12* (2013.01); *B32B 27/32* (2013.01); *B32B 33/00* (2013.01); *D04H 1/555* (2013.01); *D04H 13/00* (2013.01); *B29C 66/21* (2013.01); *B29C 66/45* (2013.01); *B29C 66/71* (2013.01); *B29C 66/7294* (2013.01); *B29C 66/919* (2013.01); *B29C 66/91423* (2013.01); *B29C 66/91935* (2013.01); *B29K 2105/0854* (2013.01); *B29K 2313/00* (2013.01); *B29L 2009/00* (2013.01); *B32B 37/0076* (2013.01); *B32B 37/0084* (2013.01); *B32B 2262/0253* (2013.01); *B32B 2305/20* (2013.01); *B32B 2307/714* (2013.01); *B32B 2310/028* (2013.01); *B32B 2323/10* (2013.01); *Y10T 428/2481* (2015.01); *Y10T 428/24826* (2015.01)

(58) Field of Classification Search
USPC ............. 442/59, 122, 62, 121, 327; 428/196
See application file for complete search history.

(56) References Cited

U.S. PATENT DOCUMENTS

| | | |
|---|---|---|
| 4,400,227 A | 8/1983 | Riemersma |
| 4,572,753 A | 2/1986 | Bach |
| 4,725,473 A | 2/1988 | Van Gompel et al. |
| 4,833,010 A | 5/1989 | Langley |
| 4,992,335 A | 2/1991 | Guerra et al. |
| 5,102,711 A | 4/1992 | Keller et al. |
| 5,162,148 A | 11/1992 | Boyé et al. |
| 5,449,428 A | 9/1995 | Desmarais et al. |
| 5,509,142 A * | 4/1996 | Connell ............ A41D 13/02 2/79 |
| 5,523,146 A | 6/1996 | Bodford et al. |
| 5,560,974 A | 10/1996 | Langley |
| 5,589,249 A | 12/1996 | Bodford et al. |
| 5,968,643 A | 10/1999 | Topolkaraev et al. |
| 6,235,658 B1 | 5/2001 | Panzer et al. |
| 6,286,145 B1 | 9/2001 | Welchel et al. |
| 2001/0051481 A1* | 12/2001 | Carroll ............ B32B 27/04 442/71 |
| 2002/0016122 A1 | 2/2002 | Curro et al. |
| 2004/0091677 A1* | 5/2004 | Topolkaraev ..... A61F 13/15252 428/184 |
| 2004/0102125 A1 | 5/2004 | Morman et al. |
| 2005/0037683 A1 | 2/2005 | Konishi et al. |
| 2005/0076418 A1 | 4/2005 | von Blucher |
| 2005/0191918 A1* | 9/2005 | Langley ............ B32B 27/08 442/59 |

FOREIGN PATENT DOCUMENTS

| | | |
|---|---|---|
| EP | 0505027 | 2/1992 |
| EP | 0604736 A2 | 11/1993 |
| EP | 0933198 | 8/1999 |
| EP | 1205296 A1 | 5/2002 |
| EP | 1304216 A1 | 4/2003 |
| EP | 1506721 A1 | 2/2005 |
| GB | 2332644 A | 6/1999 |
| JP | 58074316 A | 5/1983 |
| JP | 62282914 A | 12/1987 |
| JP | 63037923 A | 2/1988 |
| JP | 1077518 A2 | 3/1989 |
| JP | 6079784 A2 | 3/1994 |
| JP | 7186266 A2 | 7/1995 |
| JP | 11269315 A2 | 10/1999 |
| JP | 2001301093 A2 | 10/2001 |
| WO | 9517302 | 6/1995 |
| WO | 00/09333 | 2/2000 |
| WO | 0013889 A1 | 3/2000 |
| WO | 0102163 A2 | 1/2001 |
| WO | 0191992 A2 | 12/2001 |
| WO | 2004035305 A1 | 4/2004 |
| WO | 2004099009 A2 | 11/2004 |

OTHER PUBLICATIONS

Hale, W. R. et al.; "Linear Low Density Polyethylene Resins for Breathable Microporous Films"; INJ Fall 2002; pp. 34-40.

Rodie, "Assistant Editor; Quality Fabric of the Month"; Textile World; Jan. 2005; p. 1.

Dictionary.com definition of "barrier."

European Office Action dated Jun. 6, 2016 for Application No. 06794845.5.

* cited by examiner

CHEMICAL BARRIER FABRIC

TECHNICAL FIELD

The present invention relates to a chemical barrier fabric comprising a plurality of layers. Such a chemical barrier fabric may be used, for example, in the manufacture of protective apparel which protect the wearer against a wide range of chemicals or for use as military or civil defence chemical protective cover applications. Such applications include, for example, covers for the chemical protection of equipment or for the manufacture of tent components or temporary shelters or for military or civil defence medical products such as evacuation or casualty bags. By civil defence is meant any of the emergency services, police, fire brigade, hospitals and other defensive measures which might be taken by local authorities or private organisations for the protection of their members.

BACKGROUND ART

The use of Personal Protective Equipment (PPE) is mandated in industry to protect operators against various hazards such as excessive heat, mechanical abrasion or laceration, ionising radiation or exposure to toxic or corrosive chemicals which may be present in the work environment. PPE comprises, for example, protective apparel such as hooded suits, gauntlets, gloves and the like, which provide protection against a range of potentially hazardous chemicals. The materials from which such protective apparel are made may consist of a single layer of film (or multiple layers of films) either used alone or in combination with other layers such as woven or non-woven fabrics. The film layers used in the manufacture of protective apparel materials provide protection to the wearer against toxic or hazardous chemicals by ensuring a low rate of molecular permeation across the two opposing faces of the materials forming the outer surface and inner surface of the protective apparel.

The permeation of a particular chemical or mixture of chemicals across the opposing faces of such barrier materials can be measured using standard test methods to determine the effectiveness of the barrier properties of the material under test. One such standard test method is EN ISO 6529:2001 "Protective clothing—Protection against chemicals—Determination of resistance of protective clothing materials to permeation by liquids and gases" which supersedes and incorporates the principles of EN 369:1993 "Protective clothing—Protection against liquid chemicals—Test method: Resistance of materials to permeation by liquids". The former test method can be used for any chemical identified as a potential hazard which may be anticipated in a particular environment or, alternatively, it may be used for a standard range of chemicals such as that identified in Annex A (parts A2 and A3) of EN ISO 6529:2001 "Protective clothing—Protection against chemicals—Determination of resistance of protective clothing materials to permeation by liquids and gases", or ASTM F1001-99a "Standard guide for selection of chemicals to evaluate protective clothing materials."

Materials currently available for use as chemical barrier sheets or films for protective apparel manufacture include polyethylene, polyvinyl chloride, natural or synthetic rubbers and polyurethane. The limitations of such materials as chemical barriers for protective apparel have long been recognised. They are either prone to chemical degradation (e.g. polyurethane), or have poor resistance to chemical permeation through the film layer (e.g. polyethylene). Accordingly more complex materials have been developed comprising multiple layers of films bonded together by co-extrusion or by the use of an adhesive "tie" layer between the different film layers.

A known non-woven fibrous material is described in U.S. Pat. No. 3,169,899 (Du Pont). This material has found wide commercial application under the name Tyvek®. This patent lists a wide range of applications for Tyvek® including its use as a barrier material for protective clothing. In particular, it is described how Tyvek® may be coated, laminated or impregnated to provide additional barrier properties for use as a protective clothing material. Examples of such coating, lamination and impregnation are given in which the resultant sheet product consists of a Tyvek® substrate with further sheet materials attached to the whole surface of the Tyvek® substrate by any of the methods listed in the patent.

A multi-layer chemical barrier composite is disclosed in U.S. Pat. No. 4,833,010 (Kappler Safety Group). The composite is formed from a first multi-layer film sheet comprising ethylene vinyl alcohol (EVOH) film sandwiched between films of nylon. One of the nylon films is coated with a film of linear low-density polyethylene, and the second nylon film is adhesively bonded with ethylene vinyl acetate film acting as a tie layer to a non-woven polypropylene base fabric. A second multi-layer film sheet comprising a central polyvinylidine chloride film disposed between a linear low density polyethylene film outer surface and an ethylene vinyl acetate adhesive film inner surface acting as a tie layer is optionally bonded to the other surface of the non-woven polypropylene fabric. Thus, the resultant composite has either two multi-layer film components separated by a central non-woven polypropylene fabric, or a single multi-layer film bonded to the non-woven fabric Where two multi-layer film components are used, separated by a central nonwoven fabric layer, a synergistic effect on the chemical barrier properties is claimed due to the separation of the multi-layer film components by the layer of non-woven fabric. The chemical barrier material may be coloured by the addition of pigment in at least one of the adhesive layers.

Another multi-layer chemical barrier material is described in U.S. Pat. No. 4,992,335 (Sanders Associates, Inc.) This multi-layer chemical barrier material comprises a layer of polyvinylidine chloride or copolymer of vinylidine chloride bonded to at least one layer of polyolefin film by means of chemical treatment of one or more film layers, and laminating the oxidised and/or de-halogenated film layers together under heat and pressure. Additional layers may include fabric for comfort, textile scrims for strength, electrically conductive layers to dissipate static charge, or chemical indicators to warn of penetration by specified chemicals or chemical classes.

A further multi-layer chemical fabric is disclosed in U.S. Pat. No. 5,162,148 (Soplaril SA and Manufacture de Vetements Paul Boyé SA). This multi-layer chemical barrier fabric comprises a non-woven polyolefin substrate bonded by means of an adhesive tie layer to a multi-layer barrier film having an outer surface layer of polyolefin film. The multi-layer barrier film has a protective material component comprising either ethylene-hydrolysed vinyl acetate/ethylene copolymer (EVOH) at least 6 microns thick, or polyethylene terephthalate at least 12 microns thick coated with a layer of polyvinylidene chloride at least 3 microns thick. The outer film layer and non-woven substrate may be both be polyethylene or may both be polypropylene to aid welding of the surfaces together. The film layers may be either co-extruded or bonded using adhesive tie layers.

The prior art chemical barrier composites all comprise film layers bonded together over the whole planar interface between any two adjacent film layers whether by coextrusion when the materials have an affinity for each other or are compatible, or by means of an adhesive tie layer when the materials have no affinity or are incompatible. The different film layers in any of the prior art multi-layer film constructions are thus in intimate contact with each other or with an adhesive tie layer over the whole of their planar interfacial surfaces. The disadvantage of this is that the fabrics/protective apparel made from such composites are generally stiff and uncomfortable to wear.

For extreme environments laminated materials have been developed consisting of many bonded layers. The company Saint-Gobain Performance Plastics markets such a material under the name Challenge®. Challenge® contains perfluoropolymer films as the main chemical barrier component, and may comprise as many as twelve polymeric layers which are bonded together over their whole surface, so that each layer is in intimate contact with the adjacent layer(s). Such materials find their main application in military protective suits and shelters.

A disadvantage of providing a chemical barrier material comprising multiple layers is that as the number of film layers is increased, the flexibility and perceived softness of the material decreases. This is exacerbated by bonding the multiple layers over their whole planar interfaces such that when flexed, the individual film layers are unable to move relative to each other. This increases the stiffness of the material.

An example of such a commercially available composite is "Tyvek® F", a chemical barrier composite marketed by E.I. du Pont de Nemours. Tyvek® F comprises a high density polyethylene flash-spun non-woven substrate carrying a chemical barrier layer with a thermoplastic surface layer of polyethylene. The polyethylene film aids welding of the film surface and the non-woven substrate when manufacturing the required protective apparel. The chemical barrier properties of Tyvek® F are excellent against a wide range of different chemicals and chemical classes. The comfort factor is particularly important for industrial chemical protection applications where the use of such protection may be frequent. However, garments made from Tyvek® F are harsh to the touch, noisy and uncomfortable to wear.

The main object of the present invention is thus to provide a multi-layer chemical barrier fabric which overcomes or substantially alleviates the aforementioned problems.

SUMMARY OF THE INVENTION

The Applicant has discovered a principle which is that all the layers of a chemical barrier fabric can be in less than all-over contact with one another to provide a significantly improved chemical barrier effect over the sum barrier properties of the component layers.

In order to carry this principle into effect and from a first aspect, the present invention resides in a laminated chemical barrier fabric including at least first and second chemical barrier layers which have an interfacial region therebetween and which are intermittently point bonded providing a point-bonded area which is in the minority and an un-bonded area which is in the majority in the interfacial region.

By means of the intermittent point bonding of this aspect of the invention, the layers of the laminated chemical barrier fabric are not in continuous intimate contact over their whole planar interfaces, but are in intimate contact only in discrete bonded areas provided by the intermittent point bonding. The majority un-bonded area leaves a nominal air gap in the interfacial region between the chemical barrier layers. The reduced area of intimate contact between the chemical barrier layers of the laminated chemical barrier fabrics in accordance with the invention not only provides improved chemical barrier properties but also confer advantages in the required physical properties for use in protective apparel applications such as softness and comfort in use.

Advantageously, the majority unbonded area is at least about 60% and the minority point-bonded area no more than about 40% of a planar face of a chemical barrier layer in the interfacial region.

The minority point-bonded area may be from approximately 1% to approximately 40%, or from approximately 2% to approximately 19%, of a planar face of a chemical barrier layer in the interfacial region between the chemical barrier layers. However, point-bonded areas from approximately 19% to approximately 40% ensure that the chemical barrier fabric is very well bonded if, for example, it is to be used in a mechanically demanding application, whilst still conferring improved chemical barrier properties over the sum barrier properties of the individual components and avoiding compromising the synergistic effect on chemical barrier properties and increasing stiffness with higher bond areas.

The chemical barrier fabric of the present invention is distinguished from the chemical barrier fabric described in U.S. Pat. No. 4,833,010 to Kappler Safety Group as, in the fabric of the present invention, it is not essential to provide an additional component layer, such as a non-woven fabric, to separate the fabric layers to provide enhanced chemical barrier properties. The fabric of the present invention is therefore more flexible and less noisy in use than the multi-layer composite materials described in the prior art. A further advantage of the fabric of the present invention is that its structure provides a synergistic effect on chemical barrier properties, over and above the additive barrier properties of the component layers, due to the lack of intimate contact over the major area of adjacent interfaces of the component layers.

Intermittent (also known as discontinuous) point bonding providing discrete bonded areas (point-lamination pattern in a lamination process) may be provided by any means known to the skilled person. Such means can be adhesive bonding such as hot melt point adhesive bonding or powder point adhesive bonding which form the point-bonded areas or thermal bonding using heat and pressure with a single lamination pattern calender roll of which the lamination pattern has a plurality of lamination points which form the point-bonded areas. The calender roll may be a thermo-bonding calender cooperating with a smooth counter roll or a calender that cooperates with an ultrasonic applicator. Such calender rolls generally have a 19% point lamination pattern which is the industry standard and which falls within the preferred minority point-bonded area of a planar face of a chemical barrier layer in the interfacial region between the chemical barrier layers referred to above. Thus, a preferred embodiment of the present invention also includes a minority point-bonded area of 19% of a planar face of a chemical barrier layer in the interfacial region between the chemical barrier layers.

The first and second chemical barrier layers may each comprise a single layer polymer film. Alternatively, the first and second chemical barrier layers may each comprise a co-extruded (multilayer) film. In another alternative, the first chemical barrier layer may comprise a single layer polymer film, and the second chemical barrier layer may comprise a co-extruded (multilayer) film.

In order to provide for ease of lamination, the polymer preferably has a broad softening range well below the melt point of the polymer. The polymer is preferably a polyolefin, in particular polypropylene or a copolymer of polypropylene.

The co-extruded film preferably includes a chemical barrier middle (or core) layer co-extruded with first and second polyolefinic outer layers.

In a preferred embodiment, the co-extruded film includes a middle layer of hydrolysed vinyl acetate ethylene polymer (usually referred to as ethylene vinyl alcohol or EVOH) preferably of minimum 4 microns thickness, co-extruded with first and second outer layers of polypropylene copolymer. Alternatively, the middle layer of the co-extruded film may incorporate an alternative chemical barrier such as polyamide resin or polyvinylidine chloride resin.

The middle layer of the co-extruded film is preferably bonded to the first and second outer layers by use of a thin adhesive tie layer, typically about 1 micron to 4 microns thick. The outer layers of polypropylene copolymer are conveniently from about 8 microns to about 20 microns thick.

The chemical barrier fabric may further include an optional non-woven layer point-bonded to either of the opposing outer faces of the multi-layer films. The non-woven layer acts to provide both strength to the fabric and comfort as it may form the inside layer of a finished item of protective apparel.

Preferably the non-woven layer comprises a polymer such as a polyolefin or spunbonded polypropylene. Any fabric of thereto-fusible polymer or comprising a mixture of fibres including sufficient thermo-fusible fibres to form a permanent bond to the adjacent film surface may be suitable to provide the strength and comfort requirements of the product. By way of example and without limitation carded or hydro-entangled nonwoven fabrics, which may be composed either of 100% polypropylene fibres or a mixture of fibres such as 85% rayon or viscose fibres and 15% polypropylene fibres, may be considered suitable.

Conveniently, the composition of the polymer film is substantially identical to the composition of the outer layers of the co-extruded film. The composition of the non-woven layer may also be substantially identical to either the first and second chemical barrier layers or, if a co-extruded film is used, to the outer layers of the co-extruded film. Alternatively, the non-woven fabric may comprise mixed fibres or filaments at least one of which is formed of a substantially identical polymer to the polymer films or to the outer surfaces of the co-extruded films.

Thus, to form the chemical barrier fabric of the present invention, the co-extruded film may be intermittently point-bonded to a second or third component layer composed entirely or sufficiently of a substantially identical polymer to that used in the outer surfaces of the co-extruded film to form a permanent bond. By "substantially identical" it is meant that there is sufficient chemical and physical similarity between the polymers, particularly polyolefins, to form permanent thermal bonds when subjected to the appropriate temperature and pressure conditions during the laminating (point bonding) process. Such conditions are well known in the art.

The invention also comprehends a method of manufacturing any of the laminated chemical barrier fabrics defined hereinabove.

Therefore, according to a second aspect of the present invention there is provided a method of manufacturing a laminated chemical barrier fabric by a lamination process including intermittently point-bonding at least first and second chemical barrier layers which have an interfacial region therebetween to provide a point-bonded area which is in the minority and an un-bonded area which is in the majority in the interfacial region.

Advantageously, the intermittent point-bonding provides a majority un-bonded area which is at least about 60% and a minority point-bonded area of no more than about 40% of a planar face of a chemical barrier layer in the interfacial region.

As mentioned previously, intermittent point bonding may provide a minority point-bonded area from approximately 1% to approximately 40%, from approximately 2% to approximately 19%, or from approximately 19% to approximately 40% of a planar face of a chemical barrier layer in the interfacial region between the chemical barrier layers.

Advantageously, the majority unbonded area is at least about 60% and the minority point-bonded area no more than about 40% of a planar face of a chemical barrier layer in the interfacial region.

Intermittent point-bonding may be carried out by applying heat and pressure to discrete areas of the surface of the fabric, such as thermo-calender bonding or ultrasonic bonding. Alternatively, any other suitable method such as intermittent adhesive point bonding may be used.

A non-woven layer may be intermittently point-bonded simultaneously to the first or the second chemical barrier layer with any of the percentage point-bonded areas referred to above. Further layers may also be simultaneously point-bonded to the two or three-layer fabric, still providing the aforementioned point-bonded area.

According to another aspect of the present invention, there is provided a protective garment produced from any of the chemical barrier fabrics and/or by any of the methods defined hereinabove. Such garments may include, for example, suits, gloves, drapes etc. According to another aspect of the present invention there is provided non-apparel cover articles from the aforedescribed chemical barrier fabric. Such articles may include, for example, chemical barrier tarpaulins, bags, tents, shelters, evacuation bags or casualty bags.

BRIEF DESCRIPTION OF DRAWINGS

In order that the invention may be more readily understood, some embodiments thereof will now be described, by way of example only, with reference to the accompanying drawings, in which.

DETAILED DESCRIPTION OF PREFERRED EMBODIMENTS

Figure 1:
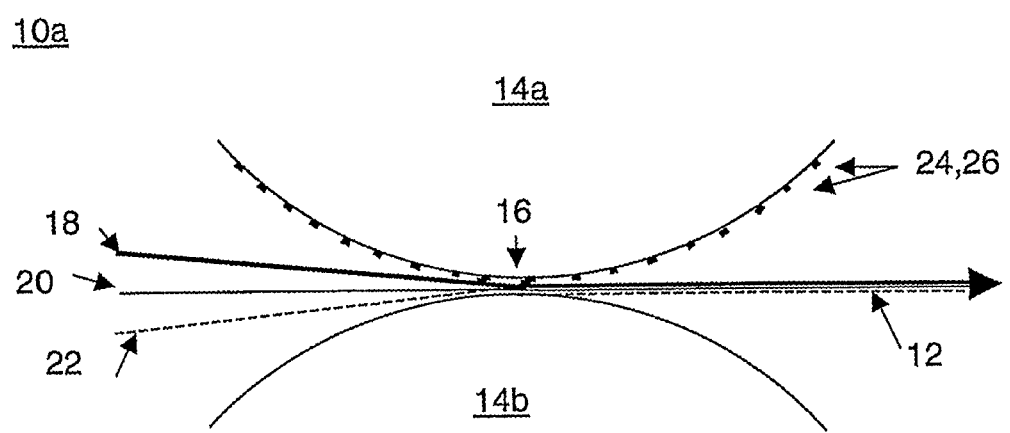
FIG. 1 is a schematic representation of a calender bonding unit forming part of a known laminating apparatus suitable for manufacturing a laminated chemical barrier fabric according to the present invention.

Referring to FIG. 1, there is shown a section of a calender unit 10a forming part of a laminating apparatus suitable for use in the manufacturing of a chemical barrier fabric 12, according to the present invention. This calendar unit 10a is known in the prior art, and comprises rotatable motor-driven oil-heated upper and lower calender rolls 14a and lower 14b located vertically adjacent one another with the rolls just touching each other when no material is provided between them. The point of contact between the calender rolls 14a and 14b provides a nip 16 through which the materials to be bonded are passed. In the chemical barrier fabric 12 shown in FIG. 1, the materials which form the fabric comprise an upper chemical barrier layer 18, a middle chemical barrier layer 20, and an optional lower chemical barrier layer support layer 22 which forms the inner surface of the chemical barrier fabric 12 in a finished protective article or in protective apparel (not shown). Typically, the upper 18 and middle 22 layers comprise polymer films, and the lower support layer 22 comprises a non-woven polymer material.

In order to effect intermittent point bonding of the material of the chemical barrier layers 18, 20 and 22, the upper calender roll 14a has a plurality of raised bosses 24, each boss providing a bond point 26. The bosses 24 are generally arranged in a pattern, known as a point-lamination pattern, on the surface of the upper calender roll 14a whilst the lower calender roll 14b has a smooth surface. The individual chemical barrier materials are generally supplied in a wound state, and are unwound and simultaneously passed between the rotating upper 14a and lower 14b calender rolls. The chemical barrier layers 18, 20 and 22 are intermittently point-bonded together at the nip 16 where the raised bosses 24 of the upper calender roll 14a compress the materials against the smooth surface of the lower calender roll 14b. The heat of the calender rolls 14a and 14b softens the material of the individual chemical barrier layers 18, 20, 22 and together with the pressure applied at the bond points 26 of the point-bonding pattern causing the materials of the chemical barrier layers to be melted locally, acts to create a point-bonded laminate of the layers 18, 20 and 22, providing a point-bonded area which is in the minority and an un-bonded area which is in the majority in an interfacial region between each two adjacent chemical barrier layers 18, 20 and 20, 22.

In use, the two calender rolls 14a and 14b are held apart by the materials being point-bonded, to an extent dependant primarily on the thickness of the materials and the set pressure. Heating of both the upper 14a and lower 14b calender rolls is achieved by thermostatically regulating the temperature of oil passing through each calender roll. The calender rolls 14a and 14b are heated to temperatures which are dependent upon the melting point of the materials being laminated. For example, if the materials comprise polypropylene, which has a melting point of 165° C., the oil of the upper calender roll 14a is typically maintained at a temperature of approximately 160° C., and the oil of the lower calender roll 14b is maintained at a temperature of approximately 155° C. These oil temperatures provide temperatures at the calender roll surfaces within the softening range of polypropylene and sufficient for bonding to be achieved between the components under pressure.

It will be appreciated by the skilled person that the pressure applied by the calender rolls 14a and 14b to the materials can be varied, along with the speed of rotation of the calender rolls. These factors have to be taken into account together with other factors such as the softening and melting points of the materials used, and the temperature of the bonding process. The calender roll speed determines the amount of time the materials are subject to the pressure and heat at the nip 16. Accordingly, the speed of the calender rolls 14a and 14b has to be set to ensure enough exposure time is given for the heat and pressure point-bonding to occur.

Figure 2:
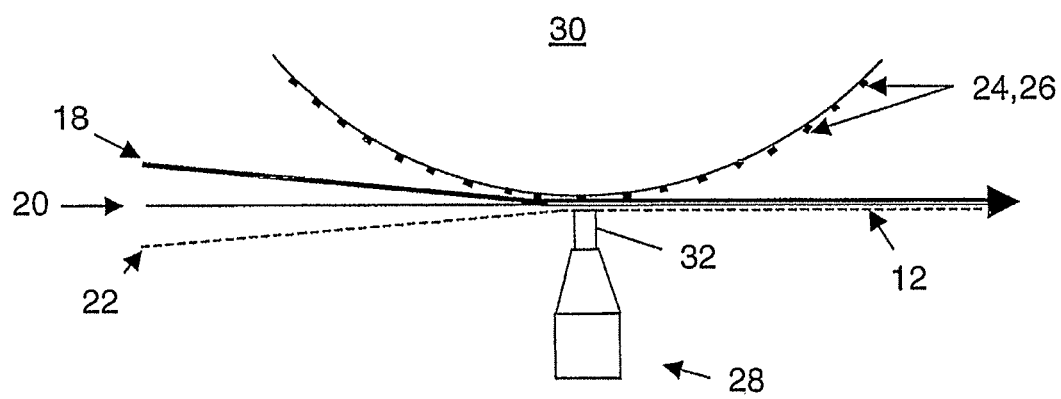
FIG. 2 is a schematic representation of an ultra-sonic bonding unit forming part of a known laminating apparatus suitable for manufacturing a laminated chemical barrier fabric of the present invention.

Referring now to FIG. 2, there is shown a section of an ultrasonic unit 10b forming part of an alternative laminating apparatus suitable for use in the manufacturing of a chemical barrier fabric 12, according to the present invention. This alternative apparatus comprises an ultra-sonic applicator 28 which includes an ultra-sonic horn 32, and a rotatable unheated anvil roll 30. The anvil roll 30 is similar to the upper calender roll 14a of FIG. 1 in that its surface carries a plurality of raised bosses 24, each boss providing a bonding point 26, the plurality of raised bosses 24 arranged in a point-bonding pattern known as a point-lamination pattern.

It will be appreciated that the arrangements shown in FIGS. 1 and 2, with the patterned calendar roll above the smooth roller and ultra-sonic unit respectively, is just one possible configuration and that the positions of the bonding unit components could, for example, be reversed without altering their function.

To manufacture the chemical barrier fabric 12 in the alternative laminating apparatus incorporating, the ultra-sonic applicator 28, the separate chemical barrier layers 18, 20 and 22 are generally provided in a wound state, and are unwound and simultaneously introduced into the gap between the ultra-sonic horn 32 and the anvil roll 30. The anvil roll 30 is rotated, and the chemical barrier layers 18, 20 and 22 are then point-bonded where the raised bosses 24 of the anvil roll 30 meet the ultra-sonic horn 32. The materials of the layers 18, 20 and 22 are bonded by the action of heat and pressure with the materials of the layers being melted locally, as for the calendar unit 10a, but the heat is generated by localised friction caused by the application of the ultra-sonic horn 32 acting upon the unheated anvil roll 30. Again, local melting acts to create a point-bonded laminate of the layers 18, 20 and 22, and provides a point-bonded area which is in the minority and an un-bonded area which is in the majority in the interfacial region between each two adjacent chemical barrier layers 18, 20 and 20, 22. The ultra-sonic horn 32 and the anvil roll 30 may advantageously be cooled to minimise thermal expansion of the components so that the gap setting between the horn 32 and the surface of the raised bosses 24 is kept as near constant as possible during extended production. This is typically achieved by air cooling the ultra-sonic horn 32 and water cooling the anvil roll 30.

The structure of the chemical barrier fabric 12 produced by the laminating processes described with reference to FIGS. 1 and 2 will now explained with reference to FIGS. 3 to 7 inclusive.

Figure 3:
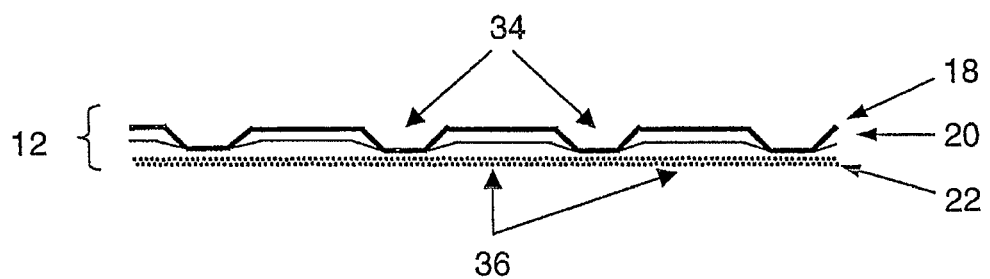
FIG. 3 is a schematic representation of a first embodiment of laminated chemical barrier fabric, according to the present invention, and incorporating several component layers.

Referring firstly to FIG. 3, it can be seen that the component layers, top film layer 18, middle film layer 20 and lower nonwoven fabric layer 22 of the chemical barrier fabric 12 are bonded together only in discrete, intermittent bond points represented by the depressions 34 to form point-bonded areas in the respective interfacial areas between the two adjacent two adjacent chemical barrier layers 18, 20 and 20, 22. Between, and surrounding, the bonded points 34 of the point-bonded area lies un-bonded areas 36 which forms the majority of the total surface area of the chemical barrier fabric 12, i.e. and the un-bonded areas are in the majority and the point bonded areas are in the minority in the respective interfacial region between the two adjacent chemical barrier layers 18, 20 and 20, 22.

Figure 4:
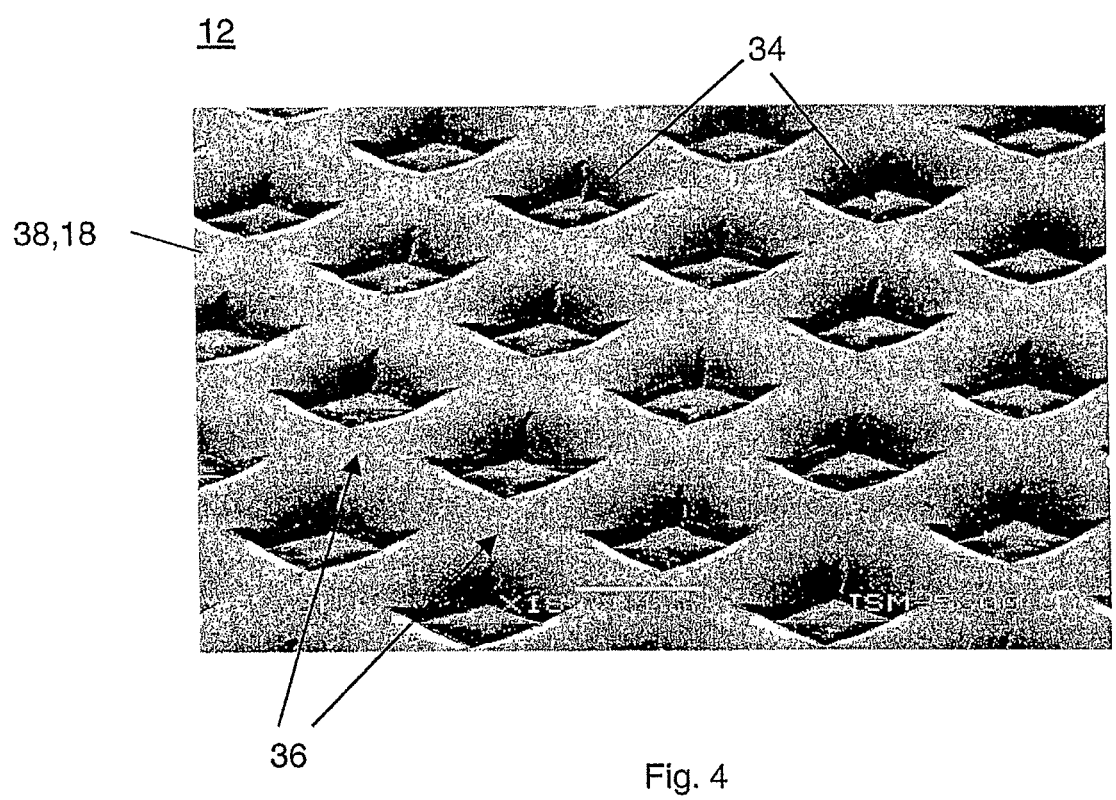
FIG. 4 is a magnified angular view photomicrograph of an upper film surface of a real chemical barrier fabric of the first embodiment of FIG. 3.

FIG. 4 shows a diamond point bond pattern formed thereon. In this case, the chemical barrier fabric 12 comprises upper layers 18 of two adjacent single layer polypropylene films, middle layers 20 of two copolymer (multilayer films and a lower non-woven layer 22 comprising a 40 g/m² basis weight spunbonded polypropylene nonwoven fabric. The process conditions to produce the chemical barrier laminate shown in FIG. 4 were calender heating temperatures of 160° C. and 158° C. respectively for the patterned and smooth calender rolls respectively, at a pressure of 95 bar and a process speed of 30 m/min.

Figure 5:
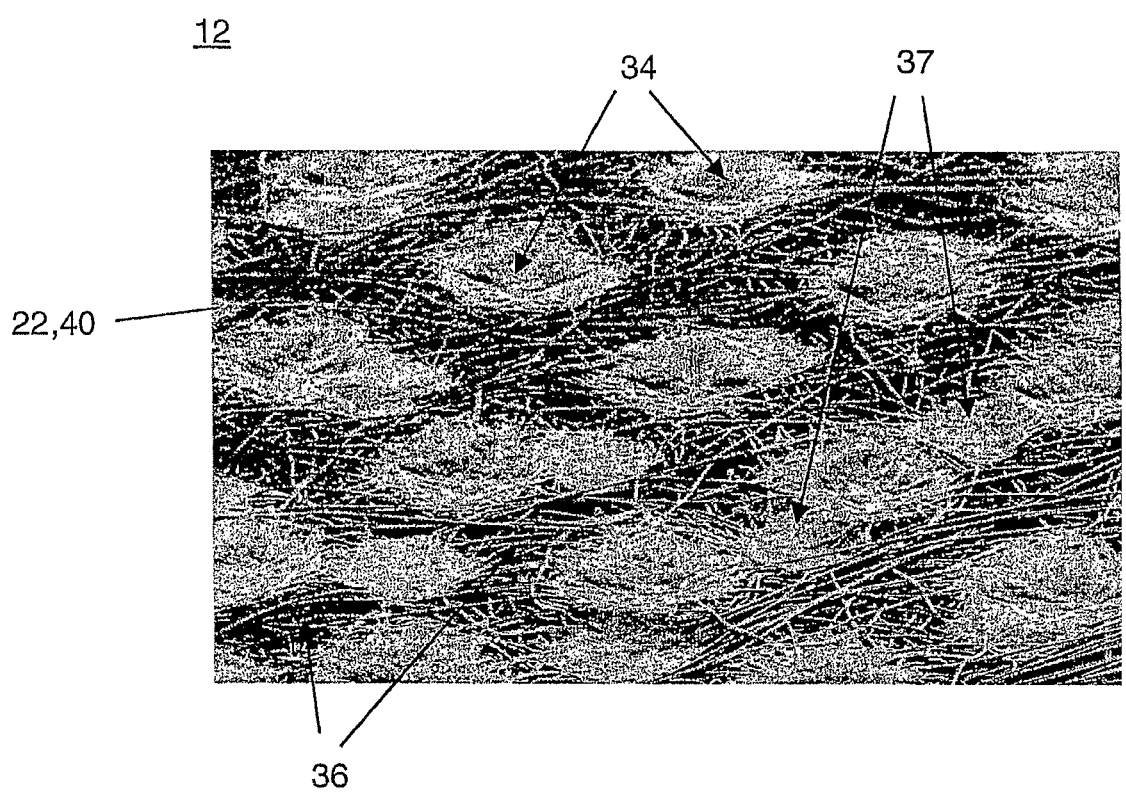
FIG. 5 is a magnified angular view photomicrograph showing a lower non-woven fabric surface of the real chemical barrier fabric of FIG. 4.

In FIG. 5 can be seen the lower non-woven surface 22 of the chemical barrier fabric 12 of FIG. 4 in which the diamond pattern bond points 34 are visible corresponding to the diamond bond points 34 in the opposing upper surface shown in FIG. 4. The point-bonded areas provided by the bond points 34 are therefore where the component layers are bonded together with free un-bonded areas 36 therebetween. Also visible in FIG. 5 are the original bonded points 37 of the nonwoven fabric 22. The bonded points 37 are where the filaments of the nonwoven fabric are bonded together are present in the raw material before lamination to the film layers. These bonded points 37 therefore do not represent areas where the components of the chemical barrier laminate are bonded together.

Figure 6:
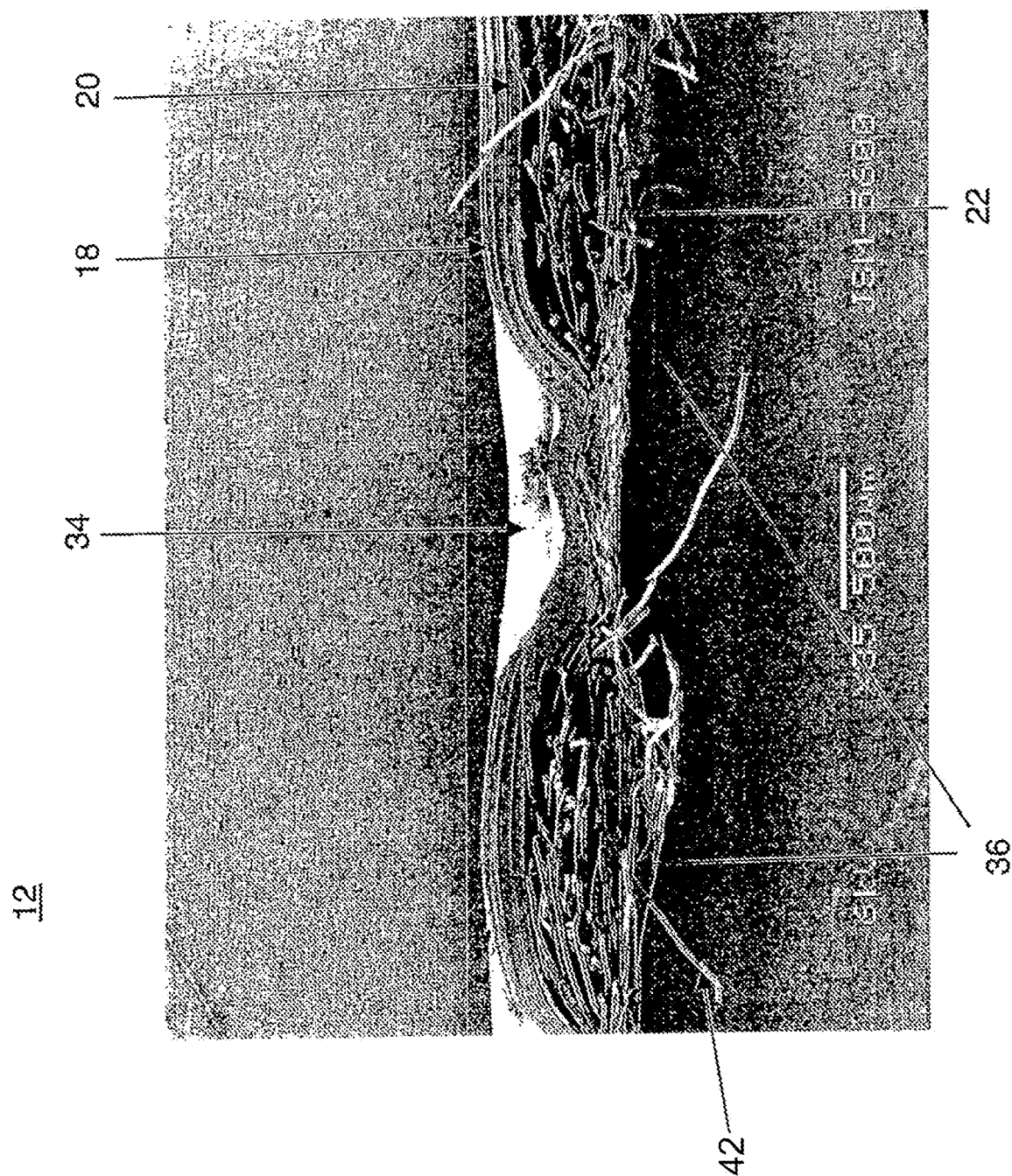
FIG. 6 is a magnified cross-sectional view photomicrograph showing un-bonded and bonded areas of the real chemical barrier fabric of FIG. 4.

FIG. 6 shows clearly the difference between the bonded points 34 of the point-bonded area which is in the minority and the unbonded area 36 which is in the majority. Also visible in FIG. 6 are the individual fibres 42 of the non-woven support layer 22, and the upper single layer polymer film layers 18 and middle co-extruded polymer film layers 20.

Figure 7:
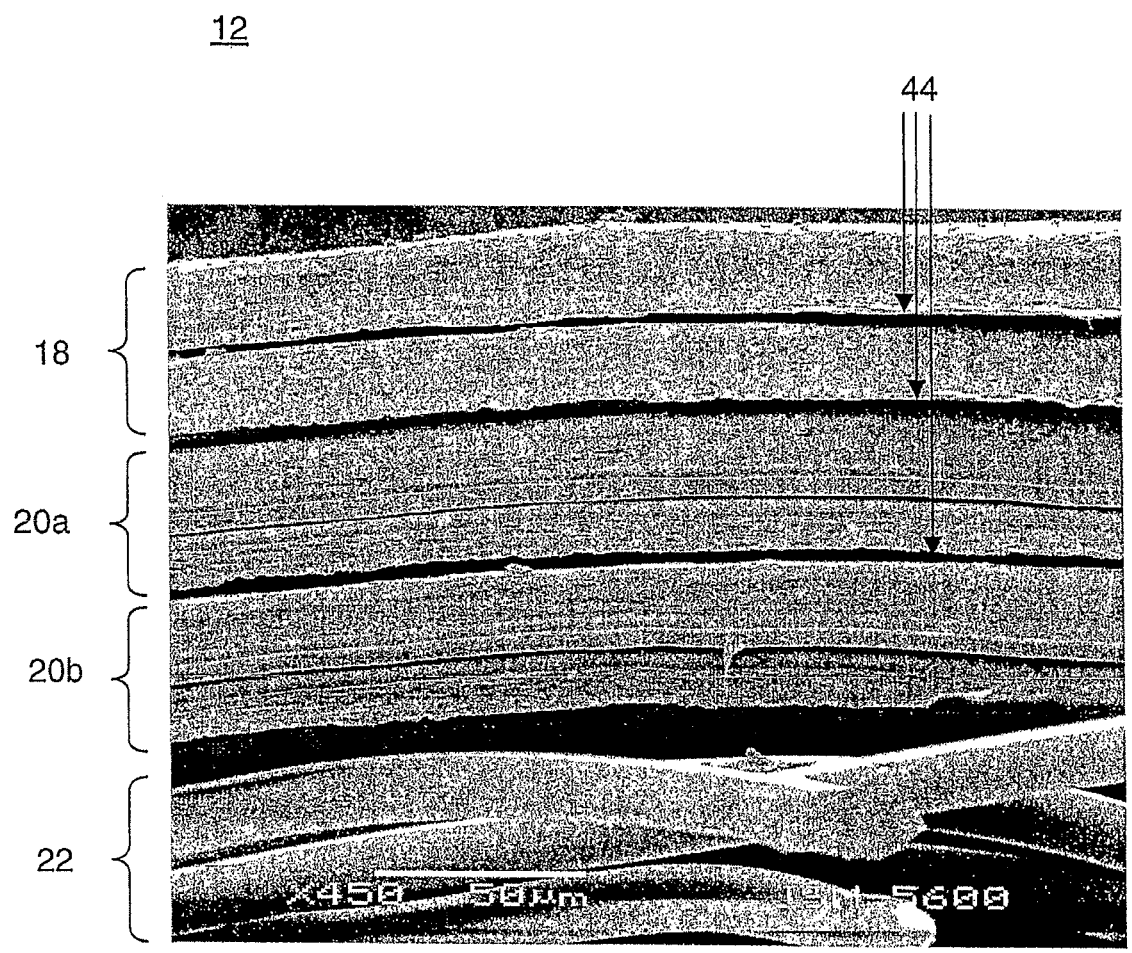
FIG. 7 is a cross-sectional view photomicrograph showing an un-bonded section of the chemical barrier fabric of FIG. 4 in high magnification.

Referring now to FIG. 7, showing the highly magnified view of an un-bonded area of the chemical barrier fabric 12 of FIGS. 4 to 6, the individual single polymer film layers 18, two co-extruded film layers 20a and 20b, the filaments of the nonwoven fabric layer 22 and air gaps 44 between the component layers are clearly visible.

The proportion of the chemical barrier fabric 12 which is bonded is dependent upon the point-bonding pattern formed on the upper calender rolls 14a (FIG. 1) or anvil roll 30 (FIG. 2). In the embodiment of FIGS. 3 to 7, the minority point-bonded area of bond points 26 or 34 is substantially 19% formed by a point-lamination pattern on the lamination pattern calendar roll 14a (FIG. 1) or 30 (FIG. 2) and the majority un-bonded area 36 is substantially 81%.

In the present invention, the un-bonded areas are in the majority and the point bonded areas are in the minority in the respective interfacial region between the two adjacent chemical barrier layers 18, 20 and 20, 22. Put another way, the point-bonding pattern is selected such that the point-bond area forms a minority only of the total surface area of the fabric 12. That is, such that the point-bonded area is less than about 40% of the surface 38 and 40 (see FIGS. 11c, 11e and 11f) of the chemical barrier fabric 12 By a surface of the fabric, it is meant either of the opposing planar outer surfaces of the chemical barrier fabric, the point-bonded area of the lamination being nominally the same on each surface.

Figure 8:
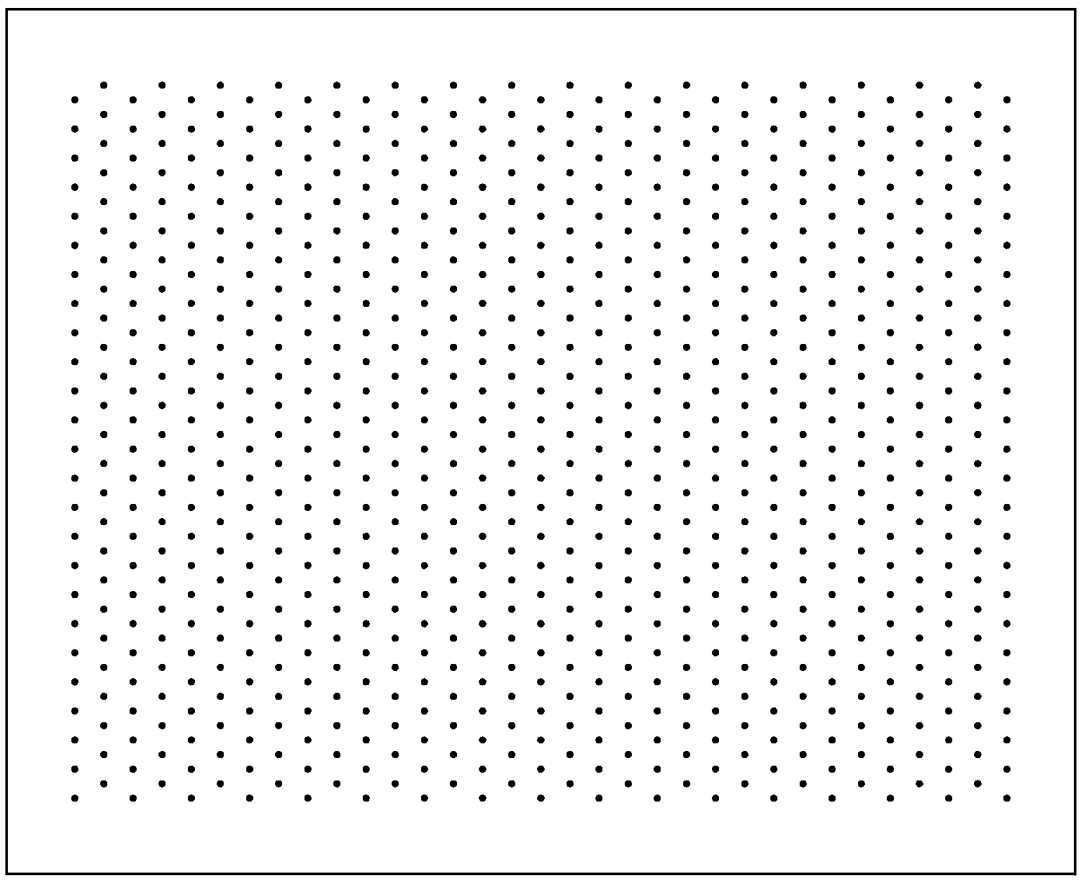
FIG. 8 shows a symmetrical point-lamination pattern suitable for point-bonding layers of a chemical barrier fabric, according to the present invention.
Figure 9:
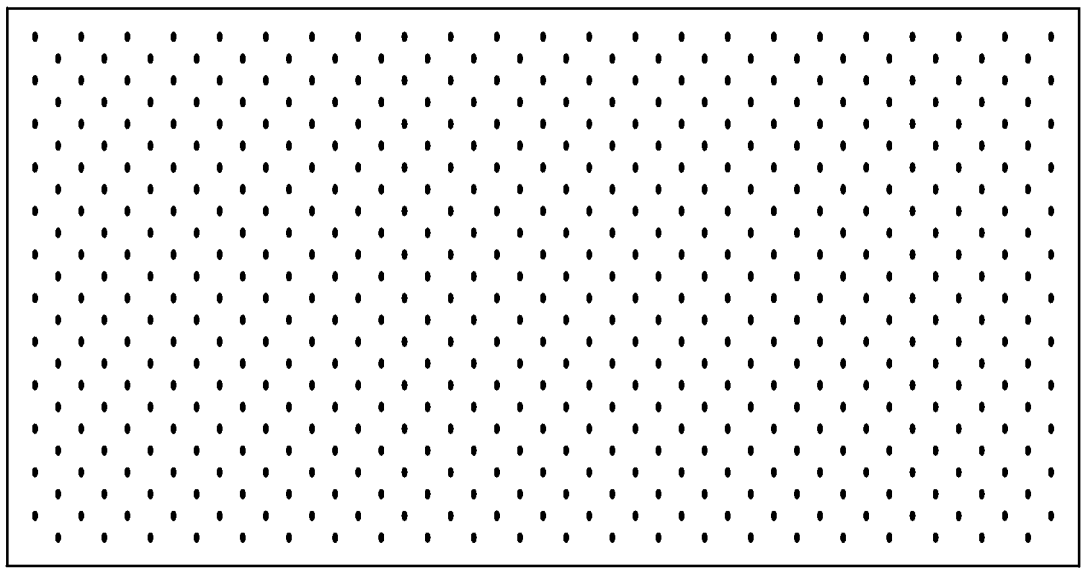
FIG. 9 shows a rectilinear point-lamination pattern suitable for point-bonding layers of a chemical barrier fabric, according to the present invention.
Figure 10:
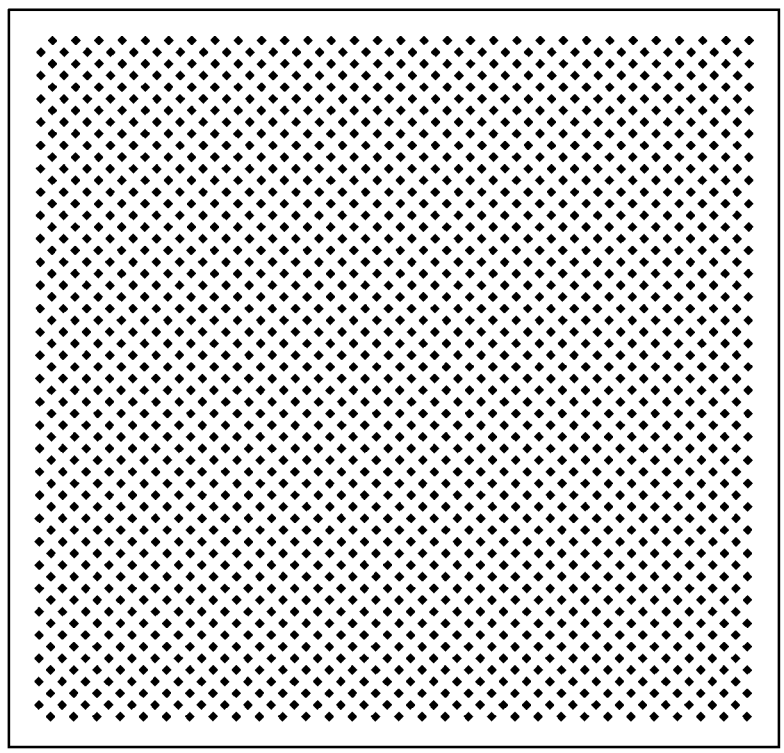
FIG. 10 shows a diamond point-lamination pattern suitable for point-bonding layers of a chemical barrier fabric, according to the present invention.

Examples of suitable point-bond patterns for manufacturing the chemical barrier fabric 12 of the present invention are given in FIGS. 8 to 10 inclusive, although it will be understood that other suitable point-bond patterns are within the scope of the invention.

Firstly, FIG. 8 shows a symmetrical point-bond pattern comprising a plurality of dots. This point-bond pattern is created by symmetrically arranging point-shaped raised bosses 24 on the surface of the upper calender roll 14a (FIG. 1) or anvil roll 30 (FIG. 2). A point-bond area comprising about 2.25% of the total surface area of the upper surface 38 (FIGS. 11c, 11e and 11f), of the chemical barrier fabric 12 is provided by this point-bond pattern.

Secondly, FIG. 9 shows a rectilinear point-bond pattern which, like the pattern of FIG. 8, comprises a plurality of dots and is produced by arranging point-shaped raised bosses 24 in a rectilinear manner on the calendar roll 14a (FIG. 1) or anvil roll 30 (FIG. 2) surface. This point-bond pattern provides a bond area of about 2.75% of the total surface area of the upper surface 38 (FIGS. 11c, 11e and 11f). Figures of the chemical barrier fabric 12.

Lastly, a point-bond pattern comprising a plurality of diamonds is shown in FIG. 10, the diamond bond areas being formed from diamond-shaped raised bosses 24 provided on the calender/anvil roll surfaces. This pattern gives a point-bond area of substantially 19% of the total surface area of the upper surface 38 (FIGS. 11c, 11e and 11f) of the chemical barrier fabric 12. FIGS. 3 to 7 also show a diamond point-bond pattern area of substantially 19%.

The present invention will be further understood by referring to the following Examples 1 to 6, and to FIGS. 11a to 11f. The Examples present the breakthrough times for known chemical barrier layers and laminates (Examples 1, 2 and 4), and chemical barrier fabrics according to the present invention (Examples 3, 5 and 6). The breakthrough times are assessed as the time taken to achieve a permeation rate of 1.0 μm/cm²/minute of a 35 weight percent ammonia solution.

Example 1

Figure 11A:
FIG. 11a is a schematic representation of a known single layer polymer film.

Referring to FIG. 11a, a known polypropylene co-polymer film 48 of thickness 30 microns was tested in its unprocessed state for permeation of ammonia solution using test method EN 369: 1993. The breakthrough time was 8 minutes.

Example 2

Figure 11B:
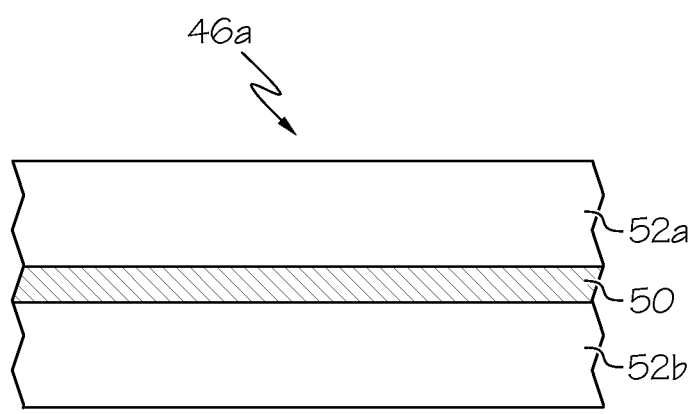
FIG. 11b is a schematic representation of a known first co-extruded (multilayer) polymer film.
Figure 11C:
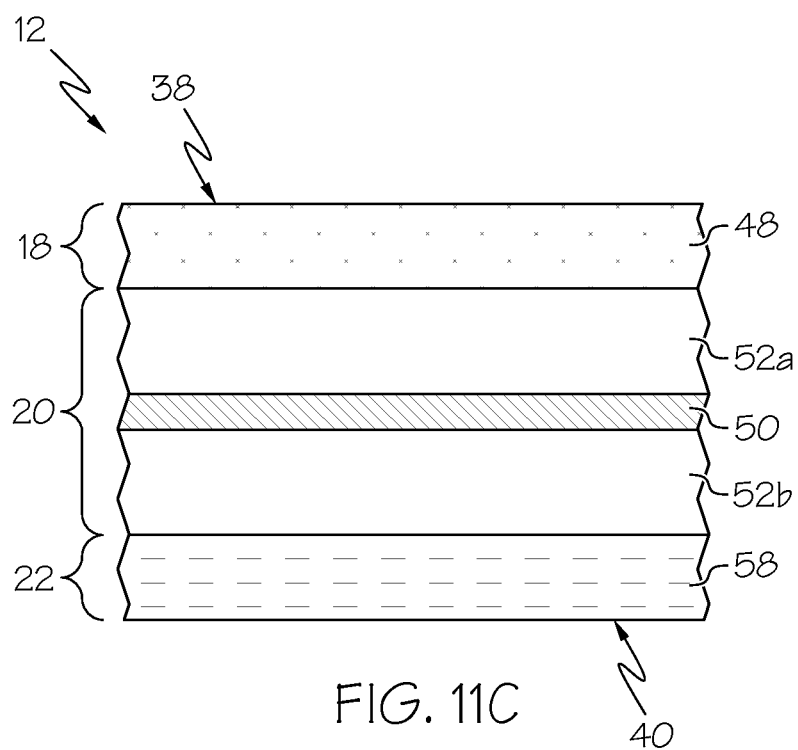
FIG. 11c is a schematic representation of a first chemical barrier fabric, according to a second embodiment of the present invention.

A known co-extruded polymer film 46a of total thickness 40 microns is shown in FIG. 11b. This film 46a comprises a 4 microns thick core layer 50 of EVOH bonded by means of tie layers (not shown) to first 52a and second 52b outer polypropylene co-polymer layers 14 microns thick. This film 46a was tested in its unprocessed state for permeation of a 35% ammonia solution as for Example 1. The breakthrough time for this film was 21 minutes.

Example 3

The 30 microns polypropylene co-polymer film 48 of Example 1 and the co-extruded polymer 46a film of Example 2 were bonded together with a 40 g/m² basis weight polypropylene spunbonded non-woven fabric 58 using thermal point-bonding in a single calender bonding lamination step. The resultant chemical barrier fabric 12 thus comprised a 30 microns polypropylene co-polymer film forming the upper layer 18 (and upper surface 38) of the fabric, a non-woven layer 58 forming the lower layer 22 (and lower surface 40) of the fabric, and a co-extruded film layer disposed therebetween forming the middle layer 20 of the fabric. This fabric structure is shown in FIG. 11c.

The diamond point-bond pattern of FIG. 10 was utilised in the manufacture of this chemical barrier fabric 12, giving a point-bond area of substantially 19% of the surface of the fabric. Approximately 81% of the area of the fabric surface was un-bonded. The extent of the bonding between the component layers 18, 20 and 22 of the chemical barrier fabric 12 is sufficient for the fabric to be handled as a single material which can be sewn or seam-welded as required to produce a functioning article of protective apparel, the non-woven layer 22 forming the inner surface of the apparel.

This chemical barrier fabric 12 was submitted to permeation testing of a 35% ammonia solution under the same conditions as Examples 1 and 2. The breakthrough time for this chemical barrier fabric was 91 minutes. It should be noted that this is appreciably in excess of the sum of the breakthrough times for the individual component films 48 and 46a tested in Examples 1 and 2. It should be noted that although neither Example 1 and Example 2 were bonded to a nonwoven fabric, the comparison with Example 3 is still valid since the test solution is in contact with the film surface of Example 3 while the collection medium, in this case deionised water is pumped within a closed loop system on the opposing side of the sample. The nonwoven fabric therefore can have no influence over the permeation of ammonia through the film layers. Furthermore, the comparison of the permeation rate for Example 3 with those of Example 1 and Example 2 indicates that the point bonding process has not significantly damaged either of the film layers when compared to the intact components of Example 1 and Example 2.

Figure 12:
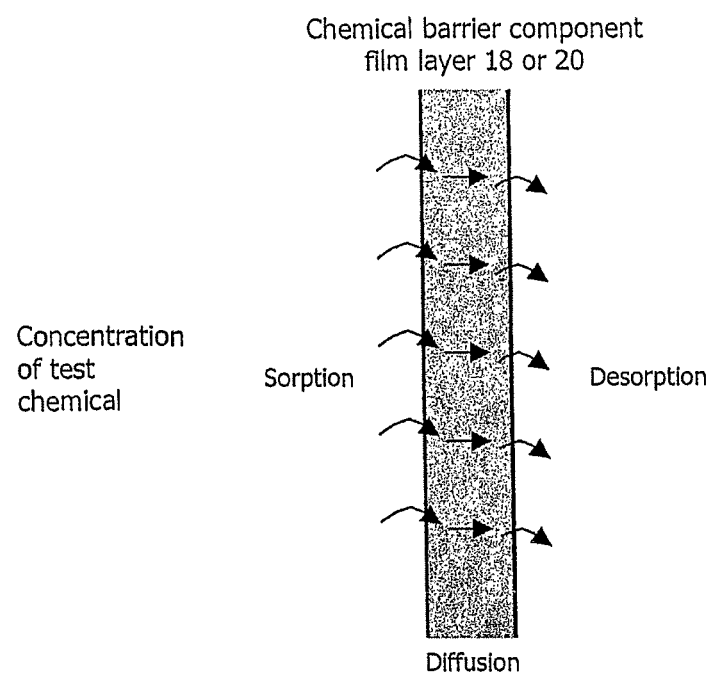
FIG. 12 is a diagram of sorption and desorption at film-air interfaces of a component layer of the chemical barrier fabric of the present invention.

The explanation of the synergistic effect is not easy to elucidate, but in addition to the diffusion rate of the chemical under consideration through the thickness of any of the film component layers 18 and 20 of the chemical barrier laminate 12 there will undoubtedly be a contribution from sorption and desorption at the film-air interfaces. This is illustrated for any one single layer of film 18 or 20 in FIG. 12. In addition to sorption and desorption effects there may be lateral diffusion of the chemical in the air spaces between the component film layers which may reduce the effective concentration of the chemical at the interface of the layer of film below and hence reduce the diffusion rate through the layer of film. In summary, the mechanisms of permeation across a multi-layer film chemical barrier 12 of the present invention is complex.

Example 4

Figure 11D:
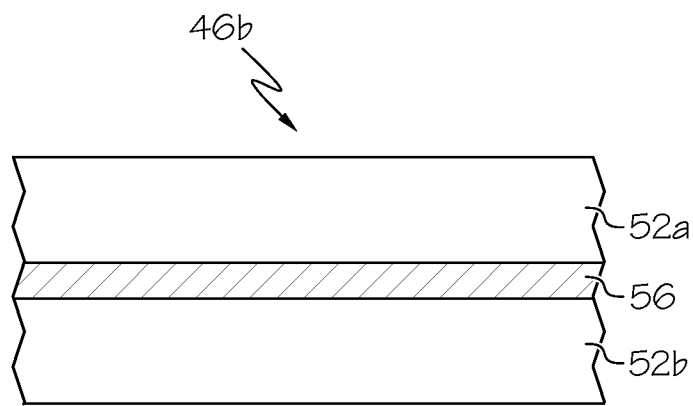
FIG. 11d is a schematic representation of a known second co-extruded (multilayer) polymer film.
Figure 11E:
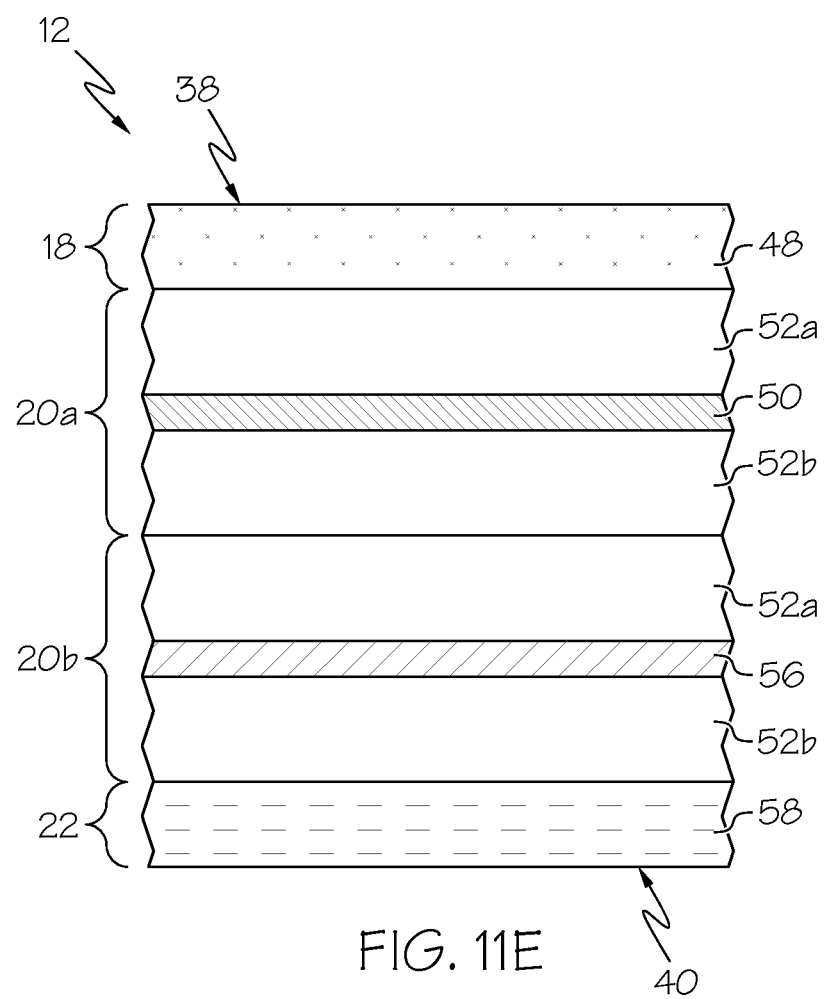
FIG. 11e is a schematic representation of a second chemical barrier fabric, according to third embodiment of the present invention.
Figure 11F:
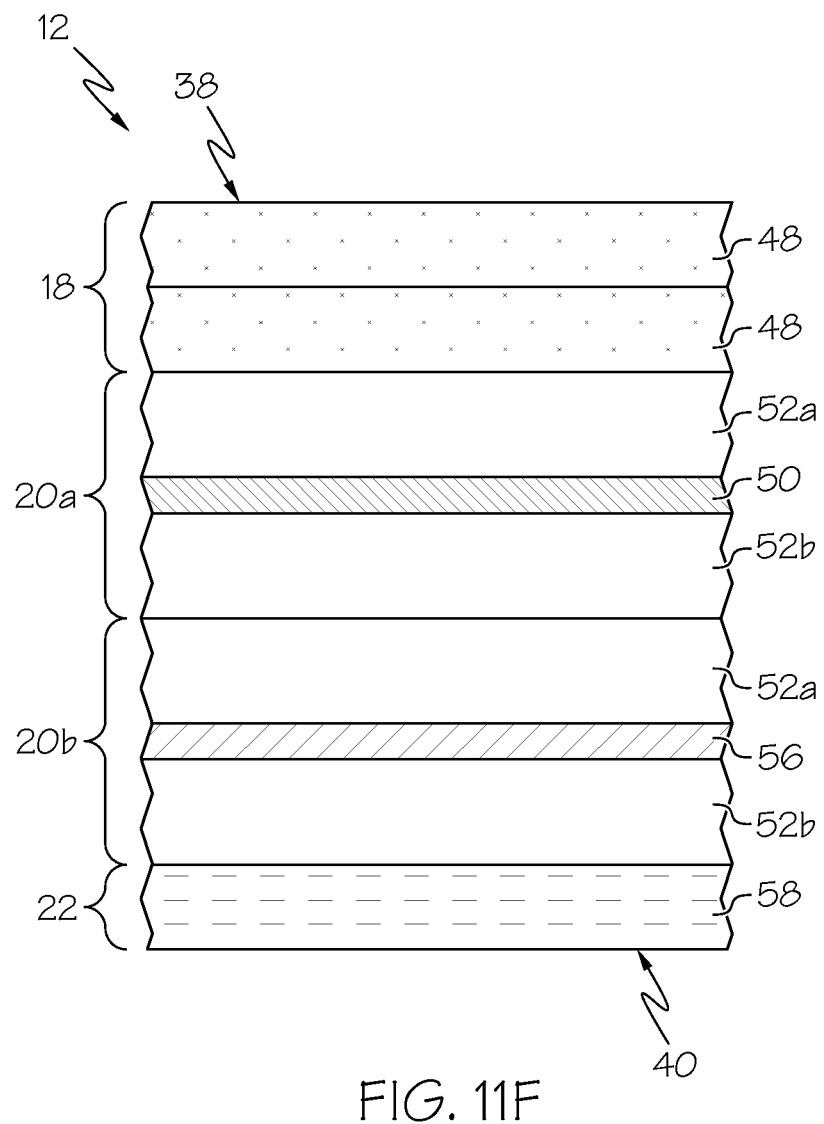
FIG. 11f is a schematic representation of a third chemical barrier fabric, according to a fourth embodiment of the present invention.

A known co-extruded polymer film 46b of total thickness 40 microns is shown in FIG. 11d. The polymer film 46b in this example comprises a 4 microns thick core layer 56 of polyamide bonded by means of tie layers (not shown) to 14 microns polypropylene co-polymer outer layers 52a and 52b.

This polymer film 46b was tested in its unprocessed state for permeation of 35% ammonia solution, and the breakthrough time was 52 minutes.

Example 5

Referring now to FIG. 11e, a chemical barrier fabric 12 according to the present invention is shown. This chemical barrier fabric 12 comprises the polypropylene co-polymer film 48 of Example 1, the co-extruded polymer film 46a of Example 2, and the co-extruded polymer film 46b of Example 4. The films were bonded together with a 40 g/m² polypropylene spunbonded non-woven fabric 58 using thermal point-bonding in a single calender bonding lamination step, as previously described.

The resultant chemical barrier fabric 12 thus comprised a 30 microns polypropylene co-polymer film forming the upper layer 18 (and thus upper surface 38) of the fabric 12, the non-woven fabric forming the lower layer 22 (and thus lower surface 40) of the fabric, and two co-extruded polymer films provided in respective first 20a and second 20b middle layers. The diamond point-bond pattern of FIG. 10 was again used in the point-bonding process. This produced a point-bond area which constituted substantially 19% of the total area of the surface 38 of the chemical barrier fabric 12. As for Example 3, this level of bonding between the component layers 18, 20a, 20b and 22 was sufficient for the fabric 12 to be handled as a single material which can be sewn or seam-welded as required to produce a functioning article of protective apparel.

This chemical barrier fabric 12 was submitted to permeation testing of a 35% ammonia solution under the same conditions as the previous examples. The breakthrough time for this particular chemical barrier fabric 12 by the same test method as used when testing Examples 1 to 4, was 180 minutes. This is appreciably in excess of the sum of the breakthrough times for the individual component films tested in Examples 1, 2 and 4 which is 81 minutes. The same comments on the validity of the comparison of Example 3 with Examples 1 and 2 apply to this Example also so that the synergistic effect of combining and bonding films to give a chemical barrier fabric of this invention is clearly evident.

Example 6

Two layers of the polypropylene co-polymer film 48 of Example 1, the co-extruded film 46a of Example 2, and the co-extruded film 46b of Example 4 were bonded together with a 40 g/m² basis weight polypropylene spunbonded non-woven fabric 58 using thermal point-bonding in a single calender bonding lamination step. The resultant fabric is shown in FIG. 11f and comprises an upper layer 18 of two 30 microns polypropylene co-polymer films 48, a first middle layer 20a of co-extruded polymer film 46a, a second middle layer 20b of co-extruded polymer film 46b, and a lower layer 22 of non-woven fabric. The upper surface 38 of this chemical barrier fabric 12 thus comprises polypropylene, and the lower surface 40 comprises a non-woven fabric.

The diamond bond pattern of FIG. 10 was utilised in the manufacture of this chemical barrier fabric 12 giving a point-bond area of substantially 19% of the total area of the surface of the fabric 12. The level of bonding between the component layers 18, 20a, 20b and 22 was sufficient for the fabric 12 to be handled as a single material which could be sewn or seam-welded as required to produce a functioning article of protective apparel.

The chemical barrier fabric 12 was submitted to permeation testing of a 35% ammonia solution under the same conditions as previous Examples 1 to 5 and the breakthrough time exceeded 326 minutes. This is appreciably in excess of the sum of the breakthrough times for the individual component films tested in Examples 1, 2 and 4 which is only 89 minutes and further demonstrates the synergistic effect of combining and bonding films to give a chemical barrier fabric of this invention.

Having described particular preferred embodiments of the present invention, it is to be appreciated that the embodiments in question are exemplary only, and that variations and modifications such as will occur to those possessed of the appropriate knowledge and skill may be made without departure from the scope of the invention as set forth in the appended claims. For example, the chemical barrier fabric is not limited to the number (or composition) of the layers described herein: more chemical barrier layers and/or support layers may be added as required.

The invention claimed is:

1. A laminated, multi-layer chemical barrier fabric, comprising:
    one or more adjacent first chemical barrier film layers, one of which forms a surface of the multi-layer chemical barrier fabric and one or more adjacent second chemical barrier film layers, which have interfacial regions therebetween and which first and second chemical barrier film layers are intermittently point bonded providing first point-bonded areas which are in the minority and an un-bonded areas which are in the majority in the interfacial regions, wherein the second chemical barrier film layers comprise a co-extruded polymer film comprising a first polyolefin film, a second polyolefin film, and a middle layer disposed between the first polyolefin film and second polyolefin film, wherein the middle layer comprises ethylene vinyl alcohol or polyamide resin, wherein the first polyolefin film and the second polyolefin film are approximately 8 to approximately 20 microns thick; and
    a spunbond non-woven layer that forms a surface of the multi-layer chemical barrier fabric comprising thermofusible mixed polyolefinic fibers point-bonded to the second chemical barrier film layer in a second point bonded area that is the same as the first point-bonded area,
    wherein the first chemical barrier film layers consist essentially of polypropylene or a polypropylene copolymer,
    wherein the first and second point bonded areas have been formed by thermal bonding using heat and pressure,
    wherein the un-bonded area comprises air gaps in the interfacial region between the first and second chemical barrier film layers,
    wherein the air gaps enhance softness, flexibility, and barrier properties of the laminated, multi-layer chemical barrier fabric, and
    wherein the spunbond non-woven layer forms a support layer,
    wherein, the chemical barrier property provided by the first chemical barrier fin layer(s), the second chemical barrier film layer(s) and the spunbond non-woven layer is, with respect to a 35% w/w ammonia solution pursuant to EN 369:1993, about 2.2 fold or more of the additive value of barrier properties of the separate first chemical barrier film layer(s) and second chemical barrier film layer(s),
    wherein the fabric has an overall thickness consistent with bonding the first and second chemical barrier film layers and the spunbond non-woven layer with heat and pressure using a single lamination with a pattern calender roll that applies bosses on one side,
    wherein the majority un-bonded area is at least 60% and the first point-bonded area is no more than 40% of a planar face of a chemical barrier layer in a given said interfacial region, and
    wherein the chemical barrier fabric is suitable to provide a chemical barrier function in personal protection equipment.

2. A laminated chemical barrier fabric according to claim 1, wherein the first point-bonded area is from approximately 1% to approximately 40% of a planar face of a chemical barrier layer in the interfacial region between the chemical barrier layers.

3. A laminated chemical barrier fabric according to claim 1, wherein the first point bonded area is from approximately 2% to approximately 19% of a planar face of a chemical barrier layer in the interfacial region between the chemical barrier layers.

4. A laminated chemical barrier fabric according to claim 1, wherein the first point-bonded area is from approximately 19% to approximately 40% of a planar face of a chemical barrier layer in the interfacial region between the chemical barrier layers.

5. A laminated chemical barrier fabric according to claim 1, wherein the first point-bond area comprises from approximately 1% to approximately 40% of a surface of the fabric.

6. A laminated chemical barrier fabric according to claim 1, wherein the first chemical barrier film layer comprises a single layer polymer film.

7. A laminated chemical barrier fabric according to claim 6, wherein the single layer polymer film is polypropylene or polypropylene copolymer.

8. A laminated chemical barrier fabric according to claim 1, wherein the first polyolefin film and second polyolefin film, comprises polypropylene and/or a polypropylene copolymer.

9. A laminated chemical barrier fabric according to claim 1, wherein the spunbond non-woven layer includes a spunbond polypropylene layer.

10. A laminated chemical barrier fabric according to claim 7, wherein the first polyolefin film, the second polyolefin film, and the composition of the first chemical barrier layer are substantially identical.

11. A laminated chemical barrier fabric according to claim 10, wherein the composition of the spunbond non-woven layer is substantially identical to the composition of the first polyolefin film, the second polyolefin film and the composition of the first chemical barrier layer.

12. A laminated, multi-layer chemical barrier fabric, comprising:
one or more adjacent first chemical barrier fin layers, one of which forms a surface of the multi-layer chemical barrier fabric and one or more adjacent second chemical barrier film layers, which have interfacial regions therebetween and which first and second chemical barrier film layers are intermittently point bonded providing first point-bonded areas which are in the minority and an un-bonded areas which are in the majority in the interfacial regions;
and
a spunbond non-woven layer that forms a surface of the multi-layer chemical barrier fabric comprising thermofusible mixed polyolefinic fibers point-bonded to the coextruded film in a second point bonded area that is the same as the first point-bonded area,
wherein the first chemical barrier film layers consist essentially of a polypropylene copolymer and the second chemical barrier film layers consist of a coextruded copolymer film,
wherein one of the second chemical barrier films comprises a first polypropylene film, a second polypropylene film, and a polyamide film disposed between the first polypropylene film and the second polypropylene film,
wherein the first and second point bonded areas have been formed by thermal bonding using heat and pressure,
wherein the un-bonded area comprises air gaps in the interfacial region between the layers of the first and second chemical barrier film layers,
wherein the air gaps enhance softness, flexibility, and barrier properties of the laminated, multi-layer chemical barrier fabric, and
wherein the spunbond non-woven layer forms a support layer,
wherein, the chemical barrier property provided by the first chemical barrier film layers, the second chemical barrier film layers and the spunbond non-woven layer is, with respect to a 35% w/w ammonia solution pursuant to EN ISO 6529:2001, at least 90 min and about 2.2 fold or more of the additive value of barrier properties of the separate first chemical barrier film layers and second chemical barrier film layers,
wherein the fabric has an overall thickness consistent with bonding the first and second chemical barrier film layers and the spunbond non-woven layer with heat and pressure using a single lamination with a pattern calender roll that applies bosses on one side,
wherein the majority un-bonded area is at least 60% and the first point-bonded area is no more than 40% of a planar face of a chemical barrier layer in given said interfacial region, and
wherein the chemical barrier fabric is suitable to provide a chemical barrier function in personal protection equipment.

13. The laminated chemical barrier fabric according to claim 1, further comprising a coextruded polypropylene copolymer film layer disposed on the first chemical barrier film layer.

14. A laminated, multi-layer chemical barrier fabric, comprising:
one or more adjacent first chemical barrier film layers, one of which forms a surface of the multi-layer chemical barrier fabric and one or more adjacent second chemical barrier film layers, which have interfacial regions therebetween and which first and second chemical barrier film layers are intermittently point bonded providing first point-bonded areas which are in the minority and an un-bonded areas which are in the majority in the interfacial regions, wherein the second chemical barrier film layers are co-extruded polymer films comprising a first polypropylene film, a second polypropylene film, and a middle layer disposed between the first polypropylene film and second polypropylene film, wherein the middle layer comprises ethylene vinyl alcohol, polyvinylidine chloride, or polyamide resin;
and
a spunbond non-woven layer that forms a surface of the multi-layer chemical barrier fabric comprising thermofusible mixed polyolefinic fibers point-bonded to the second chemical barrier film layer in a second point bonded area that is the same as the first point-bonded area,
wherein the first chemical barrier film layers consist essentially of polypropylene or a polypropylene copolymer,
wherein the un-bonded area comprises air gaps in the interfacial region between the first and second chemical barrier film layers,
wherein the air gaps enhance at least one of softness and flexibility of the laminated, multi-layer chemical barrier fabric, and
wherein the spunbond non-woven layer forms a support layer,
wherein, the chemical barrier property provided by the first chemical barrier film layer(s), the second chemical barrier film layer(s) and the spunbond non-woven layer is, with respect to a 35% w/w ammonia solution pursuant to EN 369:1993, about 2.2 fold or more of the additive value of barrier properties of the separate first chemical barrier film layer(s) and second chemical barrier film layer(s),
wherein the fabric has an overall thickness consistent with bonding the first and second chemical barrier film layers and the spunbond non-woven layer with heat and pressure using a single lamination with a pattern calender roll that applies bosses on one side,
wherein the majority un-bonded area is at least 60% and the first point-bonded area is no more than 40% of a planar face of a chemical barrier layer in given said interfacial region, and
wherein the chemical barrier fabric is suitable to provide a chemical barrier function in personal protection equipment.

15. The laminated chemical barrier fabric according to claim 14, wherein the first and second point bonded areas have been formed by thermal bonding using heat and pressure.

16. The laminated chemical barrier fabric according to claim 1, wherein the first polyolefin film, second polyolefin film, and middle layer are bonded by adhesive tie layers.

17. The laminated chemical barrier fabric according to claim 16, wherein the adhesive tie layers are approximately 4 microns thick.

18. The laminated chemical barrier fabric according to claim 16, wherein the middle layer is approximately 4 microns thick.

19. The laminated chemical barrier fabric according to claim 14, wherein the chemical barrier property provided by the first chemical barrier film layer(s), the second chemical barrier film layer(s) and the spunbond non-woven layer is, with respect to a 35% w/w ammonia solution pursuant to EN 369:1993, about 3.3 fold or more of the additive value of barrier properties of the separate first chemical barrier film layer(s) and second chemical barrier film layer(s).

20. The laminated chemical barrier fabric according to claim 1, wherein the chemical barrier property provided by the first chemical barrier film layer(s), the second chemical barrier film layer(s) and the spunbond non-woven layer is, with respect to a 35% w/w ammonia solution pursuant to EN 369:1993, about 3.3 fold or more of the additive value of barrier properties of the separate first chemical barrier film layer(s) and second chemical barrier film layer(s).

* * * * *

UNITED STATES PATENT AND TRADEMARK OFFICE
CERTIFICATE OF CORRECTION

PATENT NO. : 10,843,438 B2  
APPLICATION NO. : 13/865347  
DATED : November 24, 2020  
INVENTOR(S) : Leslie James Squires Page 1 of 1

It is certified that error appears in the above-identified patent and that said Letters Patent is hereby corrected as shown below:

In the Specification

Column 1, Line 3, insert --CROSS-REFERENCE TO RELATED APPLICATIONS
This application is a continuation of U.S. Patent Application Serial No. 12/091,361 filed June 6, 2008, which is a National Phase Entry of PCT/GB2006/003906 filed on October 20, 2006, which claims priority to GB 0521630.4 filed on October 24, 2005.-- before "TECHNICAL FIELD"

Column 5, Line 34, delete "thereto-fusible" and substitute "thermo-fusible"

Column 14, Line 18, delete "fin" and substitute "film"

Column 14, Line 37, delete "A laminated" and substitute "The laminated"

Column 14, Line 42, delete "A laminated" and substitute "The laminated"

Column 14, Line 47, delete "A laminated" and substitute "The laminated"

Column 14, Line 52, delete "A laminated" and substitute "The laminated"

Column 14, Line 55, delete "A laminated" and substitute "The laminated"

Column 14, Line 58, delete "A laminated" and substitute "The laminated"

Column 14, Line 61, delete "A laminated" and substitute "The laminated"

Column 14, Line 65, delete "A laminated" and substitute "The laminated"

Column 15, Line 1, delete "A laminated" and substitute "The laminated"

Column 15, Line 12, delete "fin" and substitute "film"

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*